United States Patent [19]

Nathan

[11] Patent Number: 5,192,906
[45] Date of Patent: Mar. 9, 1993

[54] SWITCHING REGULATOR WITH CURRENT LIMITING SHUTDOWN

[75] Inventor: Adolf Nathan, Backnang, Fed. Rep. of Germany

[73] Assignee: ANT Nachrichtentechnik GmbH, Backnang, Fed. Rep. of Germany

[21] Appl. No.: 752,687
[22] PCT Filed: Mar. 5, 1990
[86] PCT No.: PCT/DE90/00157
 § 371 Date: Sep. 9, 1991
 § 102(e) Date: Sep. 9, 1991
[87] PCT Pub. No.: WO90/10972
 PCT Pub. Date: Sep. 20, 1990

[30] Foreign Application Priority Data

Mar. 8, 1989 [DE] Fed. Rep. of Germany ....... 3907410

[51] Int. Cl.$^5$ ............................................. G05F 1/40
[52] U.S. Cl. ................................. 323/284; 323/282
[58] Field of Search ............... 323/282, 283, 284, 285, 323/351

[56] References Cited

U.S. PATENT DOCUMENTS

| | | | |
|---|---|---|---|
| 4,263,644 | 4/1981 | Zellmer | 363/26 |
| 4,316,136 | 2/1982 | Saxarra et al. | 323/282 |
| 4,378,580 | 3/1983 | Stich | 323/284 |
| 4,428,016 | 1/1984 | Brasfield | 361/18 |
| 4,607,320 | 8/1986 | Matui et al. | 363/21 |
| 4,694,240 | 9/1987 | Grünsch | 323/285 |
| 4,771,357 | 9/1988 | Lorincz et al. | 323/289 |
| 4,816,982 | 3/1989 | Severinsky | 323/285 |
| 4,943,902 | 7/1990 | Severinsky | 323/285 |
| 5,001,413 | 3/1991 | Ohms | 323/282 |
| 5,079,498 | 1/1992 | Cleasby et al. | 323/283 |

FOREIGN PATENT DOCUMENTS

| | | |
|---|---|---|
| 0027847 | 6/1981 | European Pat. Off. |
| 3402479-A | 7/1984 | Fed. Rep. of Germany |
| 61059 | 5/1981 | Israel |

OTHER PUBLICATIONS

Olla, "Comparator Logic Limits Switching Regulator Current," Electronics/Nov. 8, 1971, vol. 44, No. 23, p. 79.

Primary Examiner—Steven L. Stephan
Assistant Examiner—Jeffrey Sterrett
Attorney, Agent, or Firm—Spencer, Frank & Schneider

[57] ABSTRACT

A switching regulator employing pulse width control or pulse frequency control of an actuator includes a current limiting device which receives a signal that is a function of current through the actuator and a signal that is a function of turn-on pulses for the actuator. The actuator is blocked by the current limiting device if the signal that is a function of the turn-on pulses for the actuator becomes smaller than the signal that is a function of the current through the actuator.

8 Claims, 2 Drawing Sheets

SWITCHING REGULATOR WITH CURRENT LIMITING SHUTDOWN

BACKGROUND OF THE INVENTION

The invention relates to a method according to the and arrangement for a switching regulator.

Such a switching regulator is disclosed in Electronics, Nov. 8, 1971, Vol. 44, No. 23, page 79.

Switching regulator are often equipped with current limiting devices which switch off the switching regulator actuator if the load currents are too high, see, for example, DE 3,402,479.A1. In the switching regulator according to DE 3,402,479.A1 a voltage corresponding to the load current is formed in the load circuit and rots in a controlling manner on the pulse frequency modulator. In the switching regulator according to EP 27,847.A1 a signal is picked up which is a function of the current through the actuator and this signal is employed together with a signal that is proportional to the load current to control the pulse width modulator.

SUMMARY OF THE INVENTION

In the switching regulator according to Electronics, see above, a current limiting device is provided which detects the current through the actuator and blocks the actuator by way of a control input of the pulse width modulator if an actual current value signal derived from the current through the actuator exceeds a reference value that serves as current limiting value.

U.S. Pat. No. 4,771,357 discloses a driver circuit for a switching transistor including current limiting means. However, this arrangement does not operate as a switching regulator.

It is an object of the invention to provide a method and arrangement wherein the current limitation operates precisely with respect to its response value. This is accomplished by obtaining a reference current value from control pulses.

The invention has the following advantages:

By evaluating the actuator control pulses for the current limitation, it becomes possible to quickly switch off the actuator under a sudden change of load. For this reason, the method/arrangement according to the invention is suitable for high switching frequencies. Due to the direct evaluation of the current through the actuator, this fast reaction is further supported. Delays caused by a current evaluation on the secondary as, for example, in the switching regulator according to DE 3,402,479.A1, do not occur. With the invention, it is possible at little expense to realize a switching regulator having a reversing characteristic. For switching regulators with potential separation (transformer between supply source and load) the invention can be employed advantageously since the current limitation can take place solely in the primary circuit. Load proportional signals need not be transmitted into the primary circuit for current limitation. The invention can also be used to advantage if a precise response value is required for the current limitation, that is, an exactly reproducible value for the reversal point of the reversing characteristic. For switching regulators having a constant energy discharge time—DE 3,402,479.A1, EP 205,630.A1—the invention can be employed very advantageously.

BRIEF DESCRIPTION OF THE DRAWINGS

An embodiment of the invention will now be described in greater detail with reference to the drawing figures. In which.

DETAILED DESCRIPTION OF THE PREFERRED EMBODIMENT(S)

Figure 1:
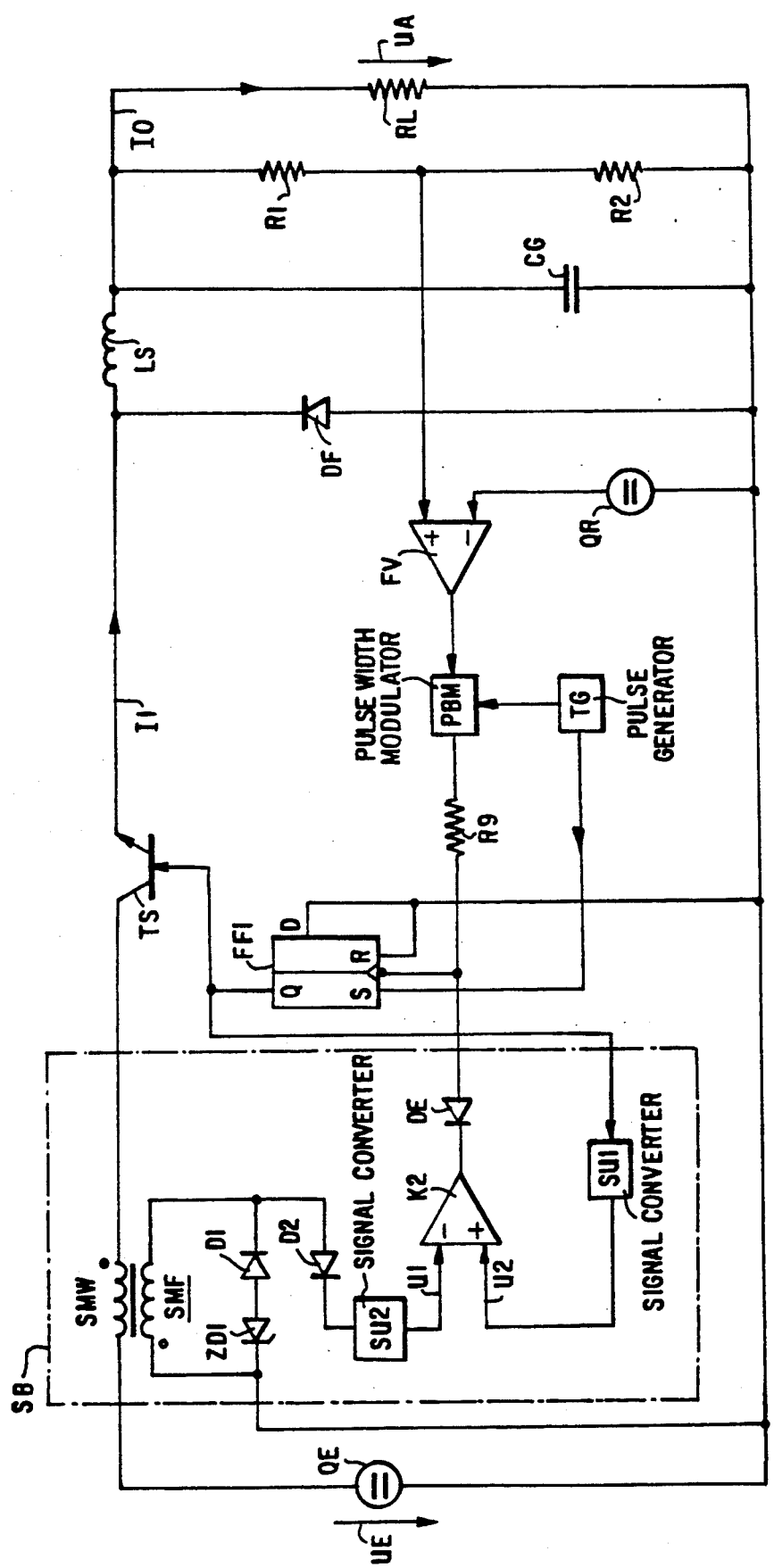
FIG. 1 shows a basic circuit diagram for a switching regulator according to the invention.

The basic circuit diagram of FIG. 1 represents a switching regulator with pulse width control. The direct voltage source QE at the input, which has an input voltage UE, is connected in series with the actuator, here configured as a bipolar power switching transistor TS, and with the switching regulator inductance LS. In the illustrated example, the switching regulator is configured as a buck converter. An idling diode DF lies in the load circuit together with the load RL. The capacitor CG is a smoothing capacitor at the output. The output voltage UA appearing at the load RL is picked up by a voltage divider R1, R2. The voltage divider tap is connected with the comparison input of an error amplifier FV. The other input of error amplifier FV is connected with a reference voltage source QR. Depending on the level of output voltage UA, error amplifier FV furnishes an input signal for a pulse width modulator PBM. At one of its outputs, a clock pulse generator TG furnishes a sawtooth signal for controlling pulse width modulator PBM. The turn-on moment of the actuator is determined by a clock pulse generator TG, whereas the turn-off moment is determined by the pulse width modulator. An integrated module DA 1060 can be employed which includes pulse width modulator PBM, clock pulse generator TG, error amplifier FV as well as the associated logic linkage circuits.

In order to limit load current 10, the invention provides a current limiting device SB in the form of a comparator K2 whose one comparison input is connected indirectly or directly with a current measuring sensor SMF and whose other comparison input is connected with the control input of transistor TS by way of a signal converter SU1. Current measuring sensor SMF detects the current I1 through transistor TS. It includes, for example, a current measuring transformer SMW whose primary winding lies in the connecting line between the direct voltage source QE and transistor TS or between transistor TS and inductance LS. Its secondary winding is bridged by the anti-series connection of a diode D1 with a Zener diode ZD1. By way of a diode D2 for rectifying the voltage at the secondary winding, current measuring sensor SMF is connected directly, or indirectly by way of a further signal converter SU2 which will be described in greater detail below, with the other comparison input of comparator K2. The current limiting device SB thus processes a signal that is a function of the turn-on pulses for transistor TS and a signal that is a function of the current through transistor TS. Current limiting device SB responds, i.e. blocks transistor TS, if signal U1 which is a function of the current I1 flowing through transistor TS becomes greater than the signal that is a function of the turn-on pulses for transistor TS. In order to realize precisely this behavior and pulse width modulator PBM as well as clock pulse generator TG operate in the usual manner, the output of pulse width modulator PBM is connected by way of a decoupling resistor R9 to a linkage member in the form of a D-flipflop FF1, namely to its negated clock pulse input. Likewise, the output of comparator K2 is connected with this negated clock pulse input by way of a decoupling diode DE. Decoupling diode DE is here polarized in such a way that the output signal of comparator K2 is able to influence the clock pulse input only in the direction of a negative potential. The second output of clock pulse generator TG, which carries needle pulses at the clock pulse frequency, sets flipflop FF1 by way of its S input. The output Q of flipflop FF1, which is connected with the control input of transistor TS, takes on the logic value 0 and thus blocks transistor TS if a negative edge from the output of comparator K2 or from the output of pulse width modulator PBM appear at the negated clock pulse input.

Figure 2:
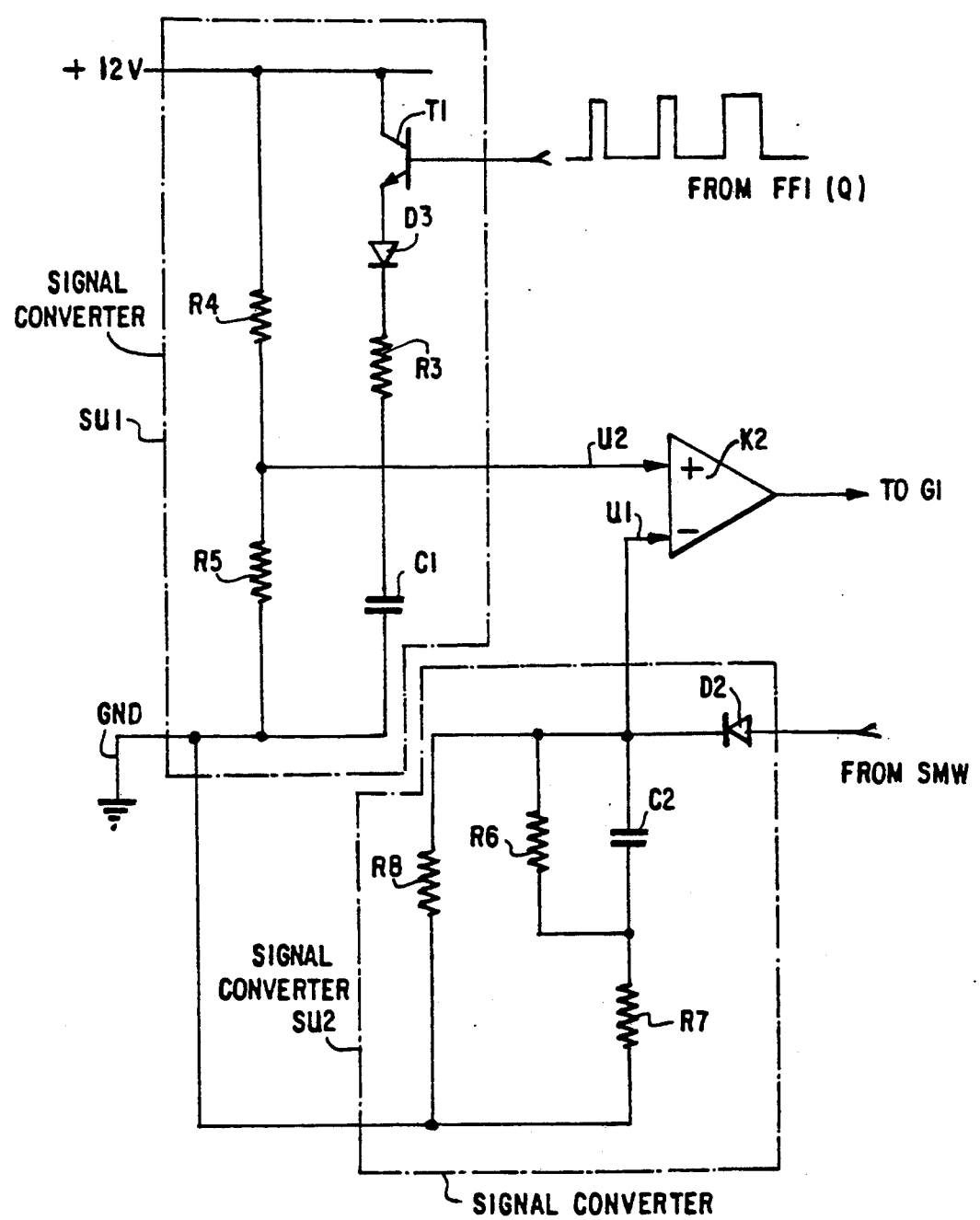
FIG. 2 shows a circuit diagram for the current limiting device.

The circuit details for an embodiment of the current limiting device SB are shown in FIG. 2. The output signal of linkage member FF1, i.e. the control signal for the actuator, is fed to the base of a transistor T1 which is a component of signal converter SU1. The collector of this transistor is charged by a supply voltage of, e.g., +12 V. A series connection composed of a diode D3, a resistor R3 and a capacitor C1 lies in the emitter line of transistor T1. A resistor R4 lies across the series connection of the collector-emitter path of transistor T1, diode D3 and resistor R3, and a resistor R5 across capacitor C1. The point of connection between these two resistors R4, R5 is connected with the one input of comparator K2. Together with its load resistance R5, capacitor C1 produces a voltage U2 relative to reference potential GND It constitutes the weighted arithmetic mean of the turn-on pulses for the actuator. This is realized by a voltage division ratio of R3:R4/R5. In this way, the direct voltage converter can be adapted to different operating conditions.

The output of diode D2 is connected to a voltage divider R6, R7 that is a component of a further signal converter SU2. This voltage divider, in turn, is bridged by a high-ohmic resistor R8, for example, of 1 megohm. The cathode of diode D2 is connected with the one input of comparator K2. At capacitor C2, which has a load resistance that is determined by the parallel connection of resistors R6 and R7, there appears a voltage U1 relative to reference potential GND. For the output signal of current measuring sensor SMF voltage divider R6, R7 acts in the sense of reducing its dynamics. Only the portion dropped across resistor R7 is added to the arithmetic mean appearing at capacitor C2.

The relatively low-ohmic resistor R7 of, e.g. 100 Ohm, is responsible for charging the capacitor. Responsible for the discharging, however, is the high-ohmic resistor R6 which is connected in parallel with R8.

So far, the method according to the invention has been described with reference to a switching regulator operating with pulse width modulation. The method according to the invention can of course also be employed advantageously for switching regulators operating with pulse frequency modulation, particularly the switching regulator according to EP 205,630.A1 which has a constant energy discharge phase. The output signal of the pulse frequency modulator or a signal derived therefrom is then fed to an input of the comparator of the current limiting device. The other input is charged accordingly with a signal that is a function of the current through the actuating transistor.

I claim:

1. A method of operating a switching regulator employing one of pulse width control and pulse frequency control of an actuator, the switching regulator including a current limiting device which receives a signal that is a function of current through the actuator comprising:
   receiving in the current limiting device a signal that is a function of turn-on pulses for the actuator; and
   blocking the actuator by means of the current limiting device using the signal that is a function of the turn-on pulses as a reference for the current limiting device if the signal that is a function of the turn-on pulses becomes smaller than the signal that is a function of the current through the actuator.

2. A method according to claim 1, wherein the signal that is a function of the turn-on pulses is formed by taking the arithmetic mean of the turn-on pulses for the actuator.

3. A method according to claim 1, wherein the signal that is a function of the current through the actuator is produced by deriving a reduced dynamics signal from the current through the actuator and adding the reduced dynamics signal to the arithmetic mean of the non-reduced signal.

4. An arrangement for implementing a method of operating a switching regulator employing one of pulse width control and pulse frequency control of an actuator, the switching regulator including a current limiting device which receives a signal that is a function of current through the actuator, the method including receiving in the current limiting device a signal that is a function of turn-on pulses for the actuator, and blocking the actuator by means of the current limiting device if the signal that is a function of the turn-on pulses for the actuator becomes smaller than the signal that is a function of the current through the actuator, the arrangement comprising:
   pulse means for generating control pulses for the actuator as a function of the output voltage of the switching regulator;
   current detecting means for detecting the current through the actuator; and
   a current limiting device for comparing a signal from the current sensor detecting means with a signal derived from the control pulses for the actuator and causing the pulse means to turn off the actuator whenever the control pulses signal becomes smaller than the actuator current signal.

5. An arrangement according to claim 4, further comprising:
   a signal converter between a control input of the actuator and a comparison input of the current limiting device for determining the weighted arithmetic mean of turn-on pulses for the actuator.

6. An arrangement according to claim 5, further comprising:
   a voltage divider for obtaining a reduced dynamics signal from the current measuring sensor;
   a further signal converter for processing the signal at the voltage divider whereby the reduced dynamics signal is added to the mean of the current measuring sensor signal.

7. An arrangement according to claim 4, further comprising:
   a linkage member connected between outputs of the pulse means, a clock pulse generator and the current limiting device SB, on the one hand, and a control input of the actuator, on the other hand.

8. In a switching regulator having a switching device connected to receive an input voltage and provide an output voltage to a load, an arrangement comprising:
- generating means for generating a control signal to control the switching device, the control signal being based on the output voltage provided to the load;
- current sensing means for sensing switching device current and providing a signal based thereon;
- comparing means for comparing the signal based on the switching device current with the control signal based on the output voltage and producing a comparison signal indicative of which is greater; and
- current limiting means for causing the generating means to turn off the switching device when the comparison signal indicates the signal based on the switching device current is greater than the control signal based on the output voltage.

* * * * *